US007290020B2

(12) United States Patent
Tecchiolli et al.

(10) Patent No.: US 7,290,020 B2
(45) Date of Patent: Oct. 30, 2007

(54) ELECTRONIC DEVICE TO CALCULATE AND GENERATE LINEAR AND NON-LINEAR FUNCTIONS

(75) Inventors: Giampietro Tecchiolli, Trento (IT); Alvise Sartori, Povo (IT)

(73) Assignee: Neuricam SpA, Trento (IT)

( * ) Notice: Subject to any disclaimer, the term of this patent is extended or adjusted under 35 U.S.C. 154(b) by 634 days.

(21) Appl. No.: 10/437,287

(22) Filed: May 14, 2003

(65) Prior Publication Data

US 2003/0217022 A1 Nov. 20, 2003

(30) Foreign Application Priority Data

May 16, 2002 (IT) .......................... UD2002A0104

(51) Int. Cl.
*G06F 1/02* (2006.01)

(52) U.S. Cl. ..................................... 708/270
(58) Field of Classification Search ............... 708/230, 708/270, 490, 524

See application file for complete search history.

(56) References Cited

U.S. PATENT DOCUMENTS

| 4,511,882 | A |   | 4/1985  | Keyes, IV et al. |         |
|-----------|---|---|---------|------------------|---------|
| 5,963,460 | A | * | 10/1999 | Rarick            | 708/501 |
| 5,996,066 | A | * | 11/1999 | Yung              | 712/221 |
| 2003/0005013 | A1 | * | 1/2003 | Steele          | 708/495 |

OTHER PUBLICATIONS

Anderson, D. et al., "A Field Programmable Analog Array and its Application", Paper No. XP-000751540, IEEE 1997 Custom Integrated Circuits Conference, vol. conf. 19, pp. 555-558 (May 5, 1997).

Patel, Minesh I. et al., "PANTHER: A Parallel Neuro Systolic Architecture for Real-Time Processing", Paper No. XP-002224310, IEEE International Conference on Neural Works, vol. 2, pp. 1006-1011 (1996).

Chan, C-K et al., "Configurable Nonlinear Filter Generator", Paper No. XP-000773767, Electronics Letters, vol. 34, No. 4, pp. 349-350 (Feb. 19, 1998).

Tanaka K et al., "An on-chip parallel processor for neural networks" Progress in Neural Information Processing. Proceedings of the International Conference on Neural Information Processing, Proceedings of 1996 International Conference on Neural Information Processing. ICONIP '96, Hong Kong; Sep. 24-27, 1996; pp. 1243-1246; vol. 2.

Kondo Y et al., "A 1.2GFLOPS neural network chip exhibiting fast convergence" Solid-State Circuits Conference, 1994. Digest of Technical Papers. 41st ISSCC., 1994 IEEE International San Francisco, CA, USA Feb. 16-18, 1994; New York, NY, USA, IEEE; pp. 218-219.

* cited by examiner

*Primary Examiner*—Chuong D. Ngo
(74) *Attorney, Agent, or Firm*—Stevens, Davis, Miller & Mosher, LLP

(57) ABSTRACT

Electronic device (10) to calculate linear functions and to calculate and generate non-linear functions, intended to process signals. The electronic device (10) is provided with a calculator unit (11) to calculate linear functions, a device (12) to generate arbitrary functions, including nonlinear functions, and a selector device (13) to selectively put the electronic device (10) in a first mode to calculate linear functions and a second mode to generate non-linear functions.

16 Claims, 1 Drawing Sheet

ELECTRONIC DEVICE TO CALCULATE AND GENERATE LINEAR AND NON-LINEAR FUNCTIONS

FIELD OF THE INVENTION

The present invention concerns an electronic device able to calculate and generate, in a rapid and programmable fashion, both linear functions, such as for example those which can be used for filters and convolution means for signals, and also non-linear functions, which can be used to implement artificial neural networks.

The device according to the invention substantially comprises at least a calculator unit suitable to generate linear functions, at least a device to generate arbitrary functions, including said non-linear functions, and at least a selector device able to selectively put the electronic device according to the invention either in the mode to calculate linear functions, or in the mode to generate and calculate non-linear functions of the inlets.

BACKGROUND OF THE INVENTION

Artificial neural networks are often used in conjunction with other functions of a linear type for the treatment and processing of data, such as for example filtering of signals, convolution, or similar.

The combination of these functions can be carried out by means of a software program suitable to operate on sequential processors.

This solution, however, is now outdated since it has been noticed that using optimized architectures dedicated to the various and specific functions better performance is obtained, both in terms of speed of calculation and in terms of accuracy For artificial neural networks, which require non-linear transfer functions, specific electronic devices are normally used suitable to calculate the relative transfer function, which can be of various type, and which typically consists of a sigmoid, Gaussian, step or ramp function or otherwise; as for the filtering or other pre-treatment of data, which on the contrary require linear transfer functions, digital signal processors (called DSP) are normally used, operating singly or in parallel.

The architectures which derive from this configuration are in any case very complex from the point of view of the circuits and often perform their calculations slowly or not in optimized manner.

The present Applicant has devised and embodied this invention to overcome these shortcomings of the state of the art, and to obtain further advantages.

SUMMARY OF THE INVENTION

The invention is set forth and characterized essentially in the main claim, while the dependent claims describe other innovative characteristics of the invention.

The purpose of the invention is to achieve an electronic device suitable to calculate both linear functions and non-linear functions, the latter being usable in particular in artificial neural networks, and integrated into a single calculation structure characterized by a simple circuit architecture.

In accordance with this purpose, the electronic device to calculate and selectively generate linear functions or non-linear functions, according to the invention, comprises at least a calculator unit, able to calculate linear functions, at least a device to generate arbitrary functions, and hence also non-linear functions, and at least a selector device able to selectively put the electronic device either into the mode of calculating linear functions, or into the mode of generating and calculating non-linear functions.

According to the invention, the switching from one selection state to the other can be made at arbitrary times, for example by the circuit user, by means of a suitable command signal, according to the type of calculation to be made at a particular time.

The device according to the invention therefore allows to generate both types of function, both linear and nonlinear, with greater economy and simplicity of circuit architecture compared with devices of a conventional type.

The principle on which the electronic device according to the invention functions is based on the fact that, in a typical calculation sequence intended to process data, the linear type operations, for example filtering to pre-process data, do not occur at the same time as the recognition and classification operations, which can be implemented with artificial neural networks and calculated with non-linear functions.

Accordingly, the electronic device according to the invention can be configured selectively and alternately, according to a particular temporal sequence or, as we have said, according to a command signal at arbitrary times, either to generate linear functions or to generate nonlinear functions, according to specific address signals sent and processed by the selector device.

BRIEF DESCRIPTION OF THE DRAWING

These and other characteristics of the present invention will be apparent from the following description of a preferential form of embodiment, given as a nonrestrictive example with reference to the attached FIG. 1, which shows a circuit diagram of the electronic device to calculate linear functions and non-linear functions according to the invention.

DETAILED DESCRIPTION OF A PREFERENTIAL EMBODIMENT

Figure 1:
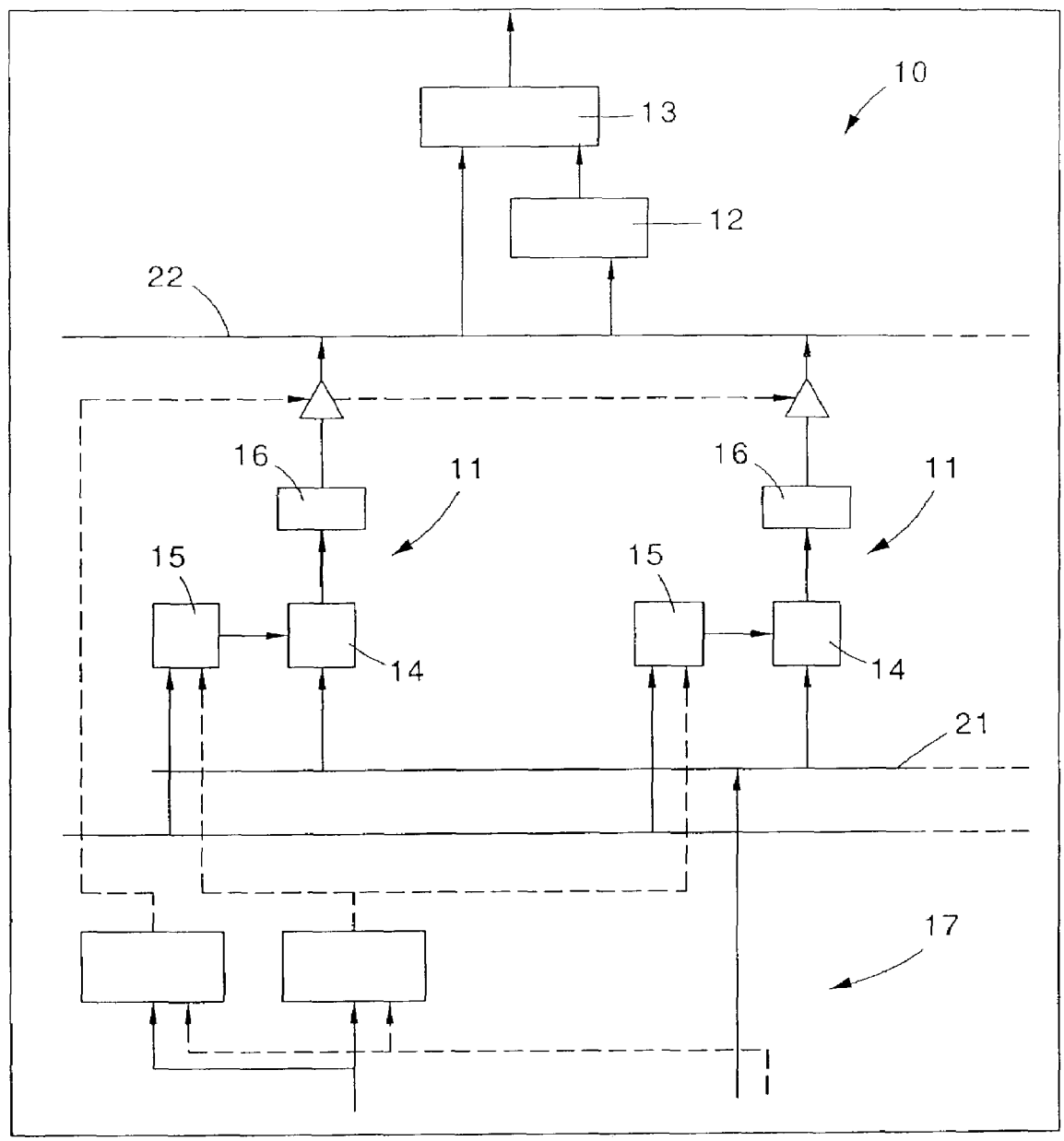

With reference to the attached drawing, an electronic device 10 to calculate linear functions and non-linear functions according to the invention comprises, in this case, two calculator units 11, a device to generate arbitrary functions 12, and a selector device 13 able to selectively put the device in a first configuration to calculate linear functions and a second configuration to generate non-linear functions.

It comes within the field of the invention that the device 10 can comprise a desired number of calculator units 11, generally between 2 and 4096.

The device to generate arbitrary functions 12 is suitable to generate desired non-linear functions as required in the calculation of artificial neural networks.

The two calculator units 11 operate in parallel, and each one of them is provided with a respective multiplier-accumulator device 14, called a MAC, able to multiply an input datum, arriving from a common input line 21, with a parameter kept in a programmable local memory 15.

The local memory 15 can be of the volatile or non-volatile type.

In series with each multiplier-accumulator device 14 there is a register 16 able to memorize the data output from each calculator unit 11 and to maintain them irrespective of the state of functioning of the relative calculator unit 11.

The function of the register 16 is to simultaneously allow operations to read the results and to generate arbitrary functions, by means of the generator device 12, and also multiplication and accumulation operations on different data.

Both the calculator units 11 are connected to the same output line 22 suitable to collect the data output from the calculator units 11, particularly from the respective registers 16, and to address them sequentially towards the device to generate arbitrary functions 12 and the signal selector device 13.

The device 12 to generate arbitrary functions, for example non-linear functions, is able to generate a desired output value according to the datum arriving from each calculator unit 11.

The generator device 12 consists of one or more look-up memories, not shown in the drawing, volatile or non-volatile, previously loaded with a desired arbitrary transfer function $y=f(x)$, in which the address lines x constitute the input data and the lines y constitute the output data from the device 12 to generate arbitrary functions.

According to another embodiment the generator device 12 comprises a dedicated calculation device.

According to another embodiment the generator device 12 comprises both a plurality of look-up memories and also dedicated calculation devices.

The selector device 13 is able to collect data from the outlet line 22 of the calculator units 11, and to address them selectively either towards the generator 12 of arbitrary functions or directly to the outlet of the electronic calculation device 10. This allows to optimize the performance of the electronic device 10 considerably, in terms of circuit complexity and execution times, in the event the calculation of the non-linear function is not required.

The electronic calculation device 10 according to the invention also comprises a control unit 17 able to put in sequence all the operations needed to perform calculations on the input data.

To be more exact, the control unit 17 verifies the addressing of the local memories 15 when they are being loaded and when they are being read during the calculation step, it pilots the selector device 13 in order to collect the data calculated and controls the loading of the register 16.

The selector 13 essentially functions as a multiplexer, allowing to decide on each occasion, just before the extraction from the registers 16, whether to address the data produced by the calculator units 11 towards the outside or to the function generator 12. The switching from one selection state to the other can be made at arbitrary times by the circuit user, by means of a suitable command signal.

The electronic device 10 to calculate linear and nonlinear functions according to the invention functions as follows.

Firstly, the calculation sequence provides an initialization step of the control unit 17, wherein the calculator units 11 are zeroed and the local memories 15 are loaded with some desired parameters.

Then, when a datum is presented at inlet to the device 10, the control unit 17 addresses a position of the memories 15, after which the multiplier-accumulator device 14 of each of the calculator units 11 multiplies the datum arriving from the inlet line 21 by the parameter present in the respective location of the local memory 15, and the product obtained is accumulated in the accumulator.

The sequence is repeated for the subsequent input datum, after the address of the local memories 15 has been varied (it is usually an increase).

At the end of the multiplication-accumulation sequence, the results of each calculator unit 11 are transferred to the respective registers 16.

From the registers 16 the data are sent to the outlet of the electronic device 10, either directly if the selector device 13 has put the device 10 in the linear function calculation mode, or through the arbitrary function generator 12, if the selector device 13 has put the device 10 in the non-linear function generation mode.

According to the invention, the electronic device 10 can be implemented on full custom or semi-custom integrated circuits based on standard cells using CMOS, or bipolar, mixed CMOS-bipolar, SOI technology, on printed circuits starting from discrete elements, on programmable logical circuits of the so-called FPGA type or similar, on hybrid circuits or multi-chip module circuits.

The multipliers can be of the full-parallel type, that is, able to execute an operation in a single basic cycle of the clock; they may also comprise a plurality of pipeline stages suitable to allow the device to perform calculations in temporally superimposed mode and hence to optimize the speed of execution.

Modifications and variants may be made to the present invention, which come within the field and protection thereof as defined in the attached claims.

The invention claimed is:

1. Electronic device to calculate linear functions and generate non-linear functions, intended to process signals, comprising at least:
   at least one calculator unit for calculating said linear functions,
   a generator device connected to the output of said at least calculator unit for generating arbitrary functions, including said non-linear functions, and
   a selector device for selectively putting said electronic device into at least a first mode to calculate said linear functions and at least a second mode to generate said non-linear functions, by directing a linear function data generated in the calculator unit to the output of the electronic device to be in said first mode or to said generator device to generate said arbitrary non-linear functions to be in said second mode,
   wherein in said second mode the results of at least one calculator unit are sent to the arbitrary function generator at arbitrary times and by means of a suitable command signal so as to generate a desired output value according to the linear function data generated from said at least one calculator unit and processed according to a desired arbitrary transfer function loaded on one or more look-up memories.

2. Device as in claim 1, wherein said selector device is able to switch between one selection state and the other at arbitrary times by means of said suitable command signal, according to the type of calculation to be made in a given time.

3. Device as in claim 1, wherein said selector device is able to switch between one selection state and the other according to a pre-determined temporal sequence.

4. Device as in claim 1, wherein said at least one calculator unit comprises at least a multiplier-accumulator device able to multiply an input datum by a parameter kept in at least a programmable local memory connected thereto.

5. Device as in claim 4, wherein said at least one calculator unit comprises a plurality of calculator units having at least a register arranged in series to said multiplier-accumulator device and able to memorize the data output from each of said calculator units and maintain them independently of the state of functioning of said calculator units.

6. Device as in claim 5, wherein said at least one calculator unit is connected to an output line able to collect the data output from the calculator units, particularly from the respective registers, and to address them sequentially to said generator device of arbitrary functions and to said signal selector device.

7. Device as in claim 4, wherein said multipliers are of the full parallel type to execute an operation in a single basic cycle of the clock.

8. Device as in claim 7, wherein said multipliers comprise a plurality of pipeline stages suitable to allow said device to perform calculations in temporally superimposed mode to optimize the speed of execution.

9. Device as in claim 4, wherein said local memory is selected from the group consisting of volatile type and non-volatile type.

10. Device as in claim 1, further comprising an output line connected to said at least one calculator unit to receive the linear function data, wherein the selector device collects data from the output line of said at least one calculator unit and addresses them selectively either towards the generator of arbitrary functions or directly to the output of the electronic calculation device.

11. Device as in claim 1, wherein said generator device of arbitrary functions comprises one or more memories loaded with an arbitrary transfer function, in said memories at least a first addressing line being able to constitute the input data and at least a second line being able to constitute the output data from said generator device.

12. Device as in claim 1, wherein said generator device of arbitrary functions comprises a dedicated calculation device.

13. Device as in claim 1, wherein said generator device of arbitrary functions comprises a plurality of memories associated with dedicated calculation devices.

14. Device as in claim 1, wherein said at least one calculator unit comprises a plurality of calculator units, and wherein said selector device functions as a multiplexer to address the data produced by said calculator units either to the outside or to said generator of arbitrary functions.

15. Device as in claim 1, wherein said at least one calculator unit comprises a plurality of calculator units ranging from 2 to 4096 calculator units.

16. Device as in claim 1, wherein the device is able to be used on full-custom or semi-custom integrated circuits based on standard cells using CMOS, or bipolar, mixed CMOS-bipolar, SOI technology, on printed circuits starting from discrete elements, on programmable logical circuits of the FPGA type, on hybrid circuits or multi-chip module circuits.

* * * * *